United States Patent [19]
Kluft

[11] Patent Number: 5,663,504
[45] Date of Patent: Sep. 2, 1997

[54] SENSOR SYSTEM

[76] Inventor: Werner Kluft, Ellerstrasse 43, 52078 Aachen, Germany

[21] Appl. No.: 615,323

[22] PCT Filed: Sep. 15, 1994

[86] PCT No.: PCT/EP94/03092

§ 371 Date: Mar. 14, 1996

§ 102(e) Date: Mar. 14, 1996

[87] PCT Pub. No.: WO95/08099

PCT Pub. Date: Mar. 23, 1995

[30] Foreign Application Priority Data

Sep. 16, 1993 [DE] Germany ............ 43 31 523.2
Sep. 17, 1993 [DE] Germany ............ 43 31 534.8

[51] Int. Cl.$^6$ .................................. G01N 29/24
[52] U.S. Cl. ................ 73/660; 73/587; 73/1.82; 73/1.84
[58] Field of Search ............... 73/660, 587, DIG. 6, 73/650; 340/680, 683; 364/551.02

[56] References Cited

U.S. PATENT DOCUMENTS

| | | | |
|---|---|---|---|
| 2,764,019 | 9/1956 | Lindholm et al. | 73/654 |
| 4,467,641 | 8/1984 | Abraham | 73/146.5 |
| 4,518,962 | 5/1985 | Imose et al. | 340/870.28 |
| 4,642,617 | 2/1987 | Thomas et al. | 73/660 |
| 4,749,993 | 6/1988 | Szabo et al. | 340/870.31 |
| 4,761,101 | 8/1988 | Zettl | 73/660 |

Primary Examiner—Hezron E. Williams
Assistant Examiner—Rose M. Miller
Attorney, Agent, or Firm—Knechtel, Demeur & Samlan

[57] ABSTRACT

In a sensor system with a wireless vibration or structure-borne noise sensor device (1), which makes direct use of the vibration energy of its electrodynamic or piezoelectric measuring unit (5) without other components to transmit the vibration energy via a primary coil (6) of a transformer-like pair of coils (6, 7) electrically connected to the measuring unit (5), to the secondary coil (7) of said pair (6, 7) which is located in a receiver (2) independent of the sensor device (1) and separated only by an air gap (8) which conducts the measured and transformed vibration or structure-borne noise measurement signal further, the sensor system is used to monitor the vibration, structure-borne noise and/or sound especially of defined material-removing tools in machine tools or to detect the noise of noise-generating structural units in testing machines or devices. The sensor device (1) is arranged on a traversing and/or rotary machine component (14), e.g., a tool holder, a workpiece holder or a test-specimen support or component holder, in which the receiver device (2) is fitted on a fixed machine component (15). During the actual monitoring process, the primary and secondary coils of the sensor device (1) and the receiver device (2) are opposite each other with the air gap (8) maintained.

12 Claims, 7 Drawing Sheets

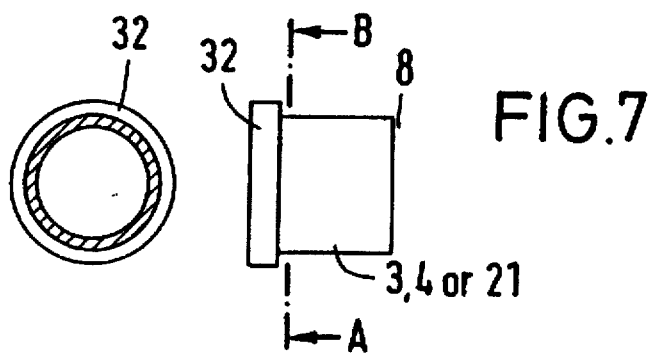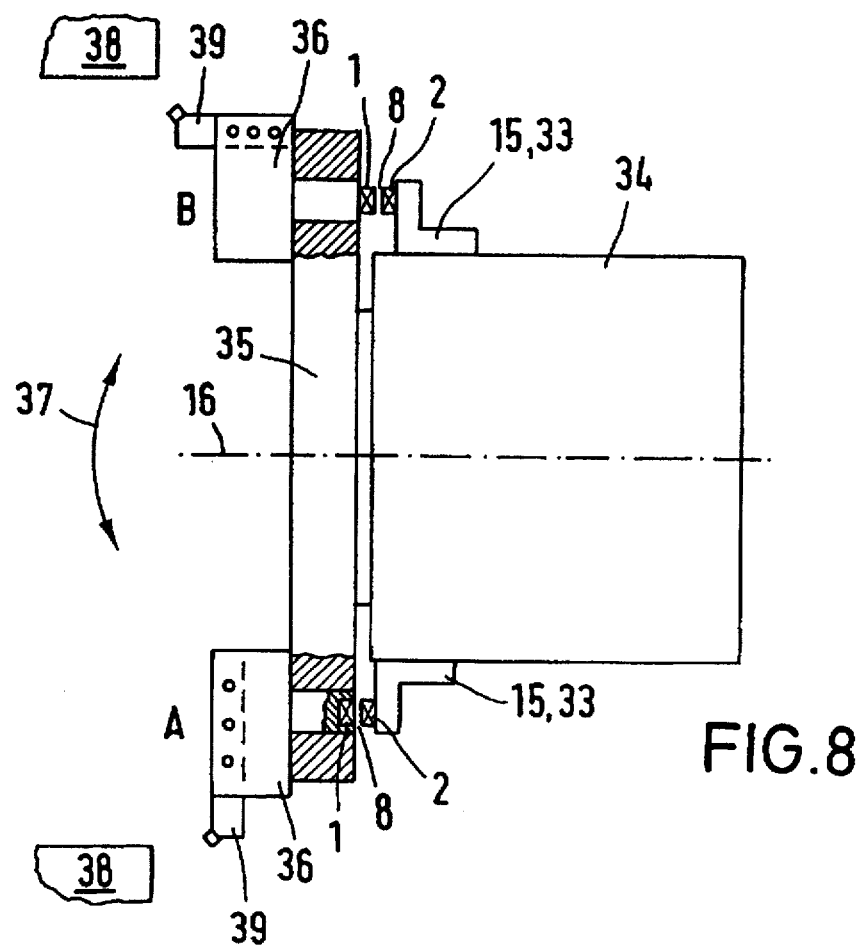

SENSOR SYSTEM

The present invention refers to a sensor system consisting of a vibration or structure-borne noise sensor device and a receiver device with a transformer-like pair of coils, the system contactlessly transmitting the vibration energy of an electrodynamic or piezoelectric measuring element via a primary coil arranged in said sensor device to a secondary coil of said transformer-like pair of coils, the secondary coil being arranged in the receiver device spaced from said sensor device by an air gap, the receiver device further transmitting the measured and transformed vibration or structure-borne noise measuring signal.

Presently, sensors for structure-borne noise and vibration sensors are known to be used in tool monitoring, the sensors being mounted on a stationary element of a machine. Then, the structure-borne noise signals or the vibration signals have to be transmitted from their point of origin via a plurality of machine elements that are partly translated and/or rotated or may be moved so, whereby the signals must be transmitted via a plurality of points of separation between the machine elements onward to the site of the stationary machine element, where the sensor is located. It is known that vibration signals and in particular structure-borne noise signals, especially those in high frequency ranges, are strongly attenuated in particular at each point of separation between two machine elements, but also in each machine element itself.

Thus, it is an aim of tool monitoring to place the vibration sensors or the sensors for structure-borne noise as close as possible to the site where the processing takes place. Therefore, the sensor should possibly be situated on the workpiece or the tool. Since both the workpiece and the tool are elements that are repeatedly replaced, mounting the sensors on the same is not feasible.

With rotating tools, e.g., drill tools, tapping tools, friction tools or milling tools, the vibration signal or the structure-borne noise signal is transmitted from the tool to the shaft via the tool holding fixture or the chucking device and from the shaft to a spindle housing via a bearing. In prior art, the structure-borne noise sensors are presently mounted on such a spindle housing and the structure-borne noise monitoring has to operate with strongly attenuated structure-borne noise or vibration signals. Moreover, it has to cope with disturbing noise from the beating which often is a roller bearing.

Today, a frequently stated demand is to pick up the vibration or structure-borne noise signal at the workpiece for monitoring the tool. Since the same is frequently replaced, of course, the idea/site for mounting sensors would be the workpiece support or the chucking device for the workpiece. In machining centers, milling or drilling machines, the workpieces are often fastened onto pallets that are transported to the respective cutting tools by means of appropriate carriage guide systems and are transported away after cutting so that workpieces can be loaded onto and unloaded from the pallets outside the immediate machining space. It is possible to mount a vibration sensor or a structure-borne noise sensor at the workpiece fitting or the chucking device or the pallet; however, there is a disadvantage in that, due to the connecting cable, the movement of the pallets or carriages is hindered, if no additional provisions for transmission devices for transmitting the structure-borne noise signal are made. Without such a transmission device, a structure-borne noise sensor can presently only be mounted on the stationary carriage guides, the signal originating from the workpiece being strongly attenuated through the several separation planes between the machine elements themselves. Such intermediate machine elements are, for example, the workpiece supports or the chucking device itself, the pallet, the table with its own guiding units and the components disposed between the table and the guiding units, such as annular spur gears that make it possible to rotate the table relative to its guide means so as to position the workpiece.

Lathe tools are often situated on a tool revolver provided with a plurality of tools. During non-productive times the tool revolver pivots the tools arranged on its revolver disk or its revolver head into another position so that the machining of the workpiece can then be continued using another tool. According to prior art, structure-borne noise sensors are presently mounted on the revolver housing. The vibration or structure-borne noise signals have to travel to the sensor from the tool via the tool holder to the tool support and then via the revolver disk or the revolver head, which in many cases have one or a plurality of annular spur gears, to the revolver housing and on to the sensor.

Again, the attenuation of the signal effected by the numerous coupling sites between the individual machine elements is substantial.

Today, according to custom's specifications, noise generating component units such as motors, gears and the like, may not exceed a certain noise level. In prior art, this problem is presently solved by detecting, in low-noise test cabins, the airborne sound emitted by a component via airborne sound microphones and sending the same to appropriate test or monitoring apparatus.

In a known sensor system for measuring structure-borne noise, a separate structure-borne noise sensor is mounted on a traversing or rotating machine element, in this case a multiple-spindle drill-head, and the structure-borne noise signals are transmitted to a so-called rotor where they are amplified and transmitted to the stator. However, this device feeds electric energy into the rotor, whereby to effect the amplification or the signal processing, in order to transmit the structure-borne noise signal to the stator. Such a sensor system further has the substantial disadvantage of requiring a lot of components, which makes it correspondingly costly and, in particular, bulky.

DE 33 30 519 A1 describes a method for the contactless transmission of a signal from an exclusively rotated element to a stationary element, the signal transmission is effected by two inductively coupled coils. The sensor-side coil is part of an resonant circuit with a piezoelectric transducer. Such an arrangement is already very compact. However, it is a drawback of this method that, on the sensor side, a number of elements for building the resonant circuit are required and that, moreover, through mutual inductance, further elements are required on the receiver side. The method of DE 33 30 519 A1 is directed to rotating elements only and/or requires a larger amount of active and passive electronic components.

DE 40 07 838 C2 describes a device for contact detection with grinding machines. Similar to the latter method, the measuring signal transmission is done in this device without an auxiliary energy source in the sensor part. Its application is limited exclusively to the detection of contacts between a grinding wheel forming a first body and a workpiece forming a second body. Further, it is limited to an application on rotary shafts of grinding wheels.

It is the object of the invention to provide for the wireless detection of vibration signals or structure-borne noise signals of traversing, rotary or traversing and rotary movable machine elements on which tools, workpieces or noise-generating structural units are present, and for the transmission of these signals to a corresponding monitoring or testing unit.

The object is solved with a sensor system consisting of a vibration or structure-borne noise sensor device and a receiver device with a transformer-like pair of coils. The system contactlessly transmits the vibration energy of an electrodynamic or piezoelectric measuring element via a primary coil arranged in the sensor device to a secondary coil of said transformer-like pair of coils, the secondary coil being arranged in the receiver device spaced from the sensor device by an air gap. The receiver device further transmits the measured and transformed vibration or structure-borne noise measuring signal such that the measuring element is connected directly with the primary coil and the measuring element is mounted on a moveable machine element. The receiver device is disposed on a stationery machine element and the sensor device and receiver device are positioned with the primary and secondary coil being opposite each other during the monitoring process while maintaining the air gap.

The sensor system for measuring vibration and/or structure-borne noise signals for monitoring tools or noise-generating elements in machine tools or testing machines picks off the structure-borne noise signals from a machine element that may be traversed, rotated or traversed and rotated.

The invention provides a sensor system that picks off the structure-borne noise signals already from the pallet or the tool holder device or the tool chucking device, whereby the above-described attenuation of the structure-borne noise signal is avoided.

According to the invention, the above-mentioned problem is to be solved with a sensor system comprising, on the sensor side, only a housing body, a piezoelectric or electrodynamic oscillating element and a primary coil, and comprising, on the receiver side, only a secondary coil in a corresponding housing. Such a sensor system is used in many applications.

Moreover, the invention allows for an improved monitoring of collisions between grinding wheels and other machine elements in a grinding machine, as well as a better monitoring of the dressing of grinding wheels, which monitoring is done today using wired stationary structure-borne noise sensors on non-rotating parts of grinding wheels.

It is also possible to use the sensor system for measuring noises in testing stands or testing devices, in which structural units are tested for other testing criteria, anyway, so that the noise or vibration signal emitted from the same can be detected by a vibration sensor or a structure-borne noise sensor. Thus, low-noise testing stands become obsolete. Similar to the drilling or milling machine or the machining center, there is the same problem that the structural units are located on a movable transport device and that the cable of a vibration or structure-borne noise sensor fastened on this transport device would be an intolerable hindrance.

The following is a detailed description of embodiments of the invention taken in conjunction with the drawings.

Figure 4:
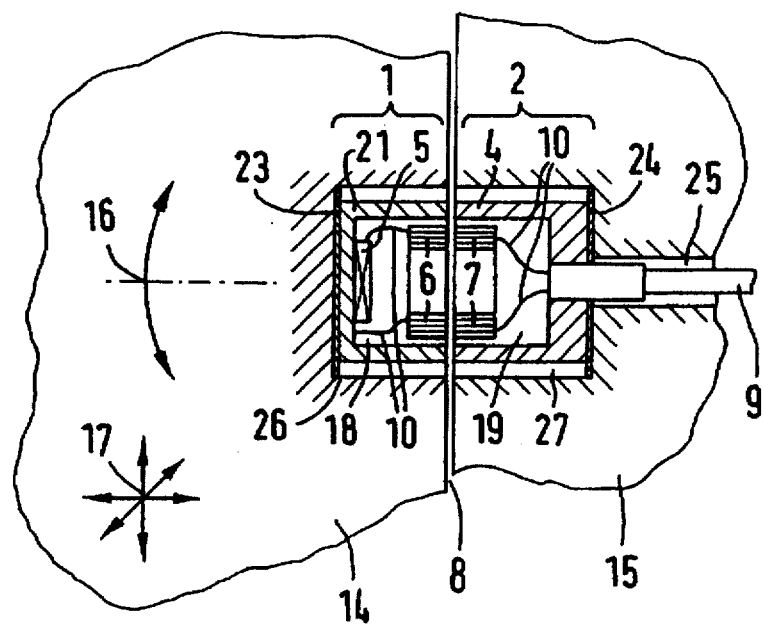
Figures 5, 5A:
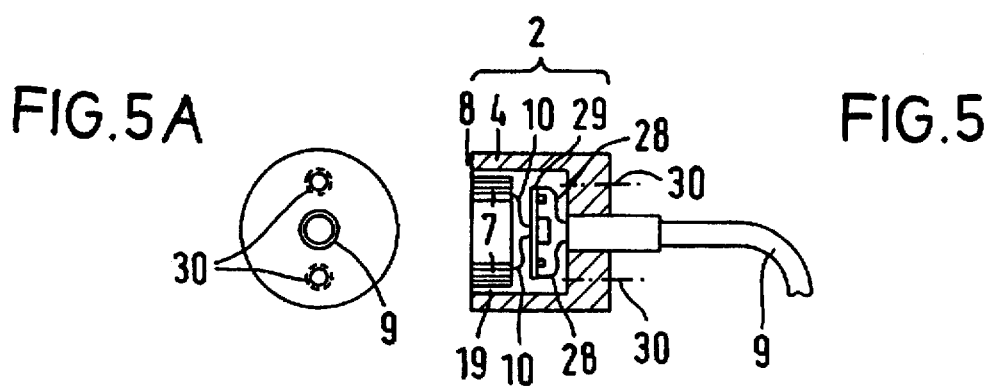
Figures 6, 6A:
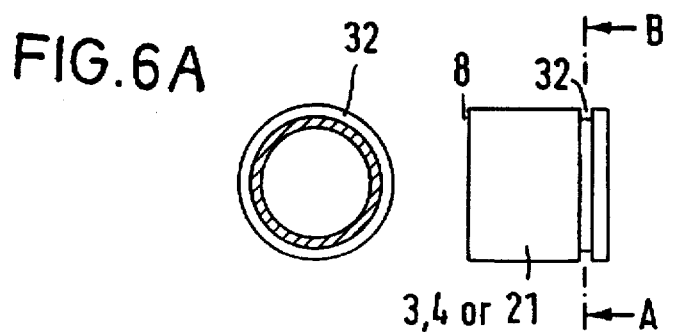
Figure 9:
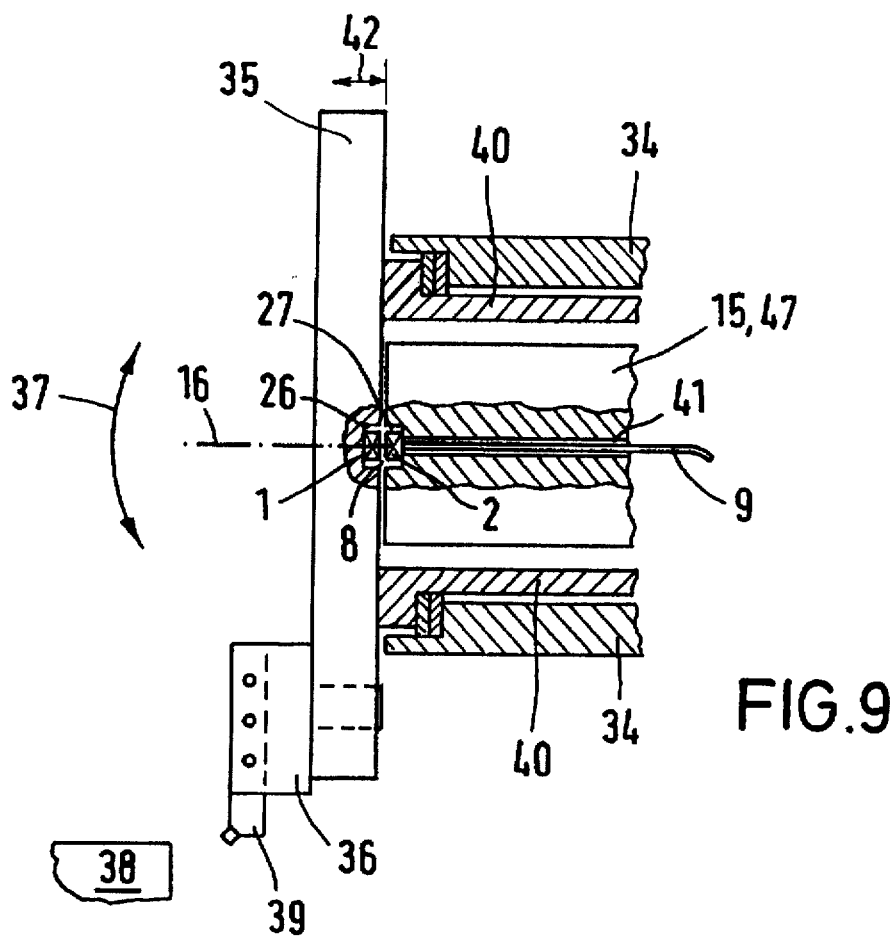
Figure 10:
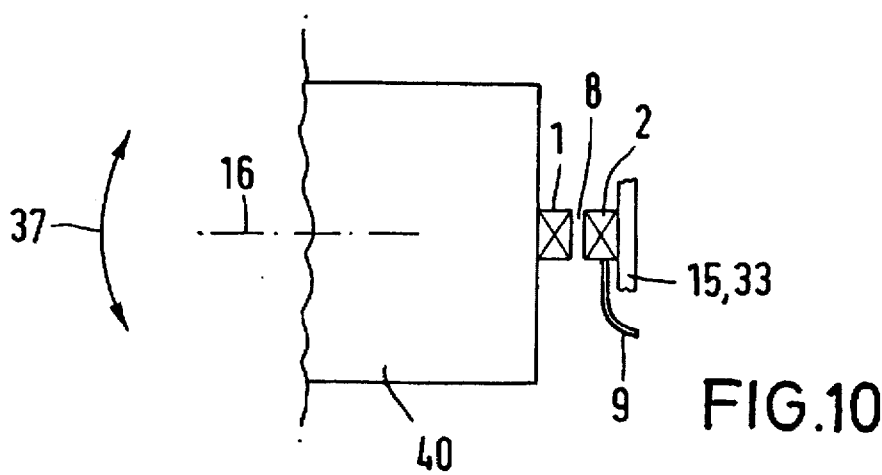
Figure 11A:
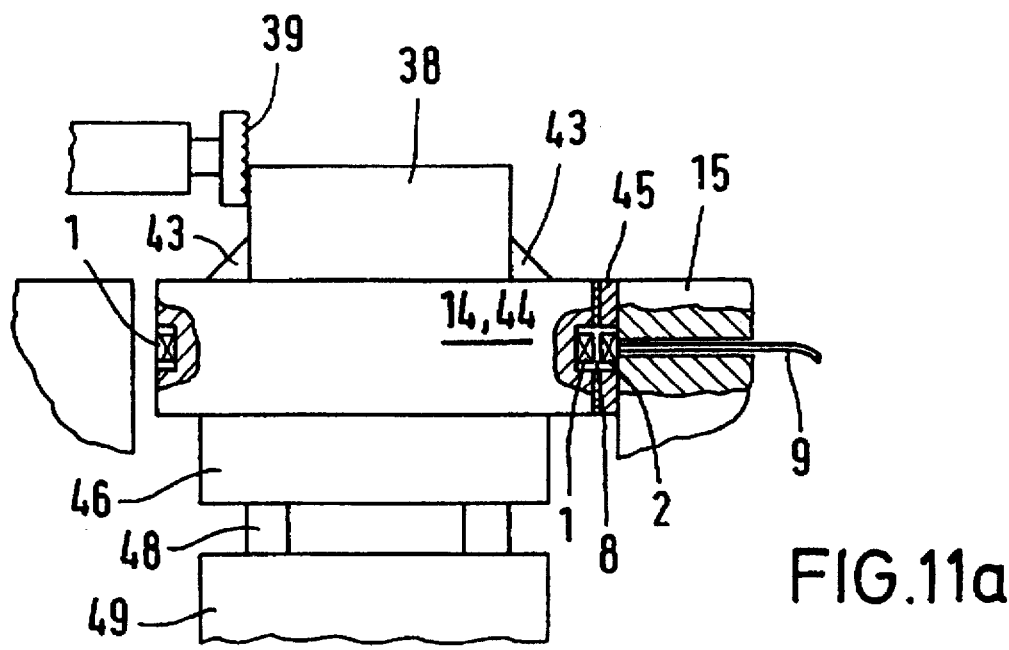
Figure 11B:
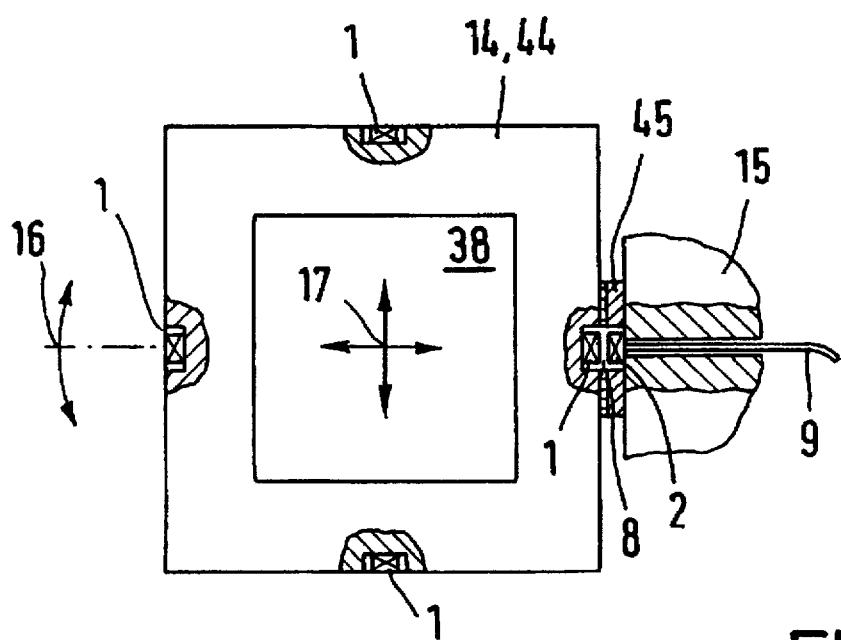
Figure 12:
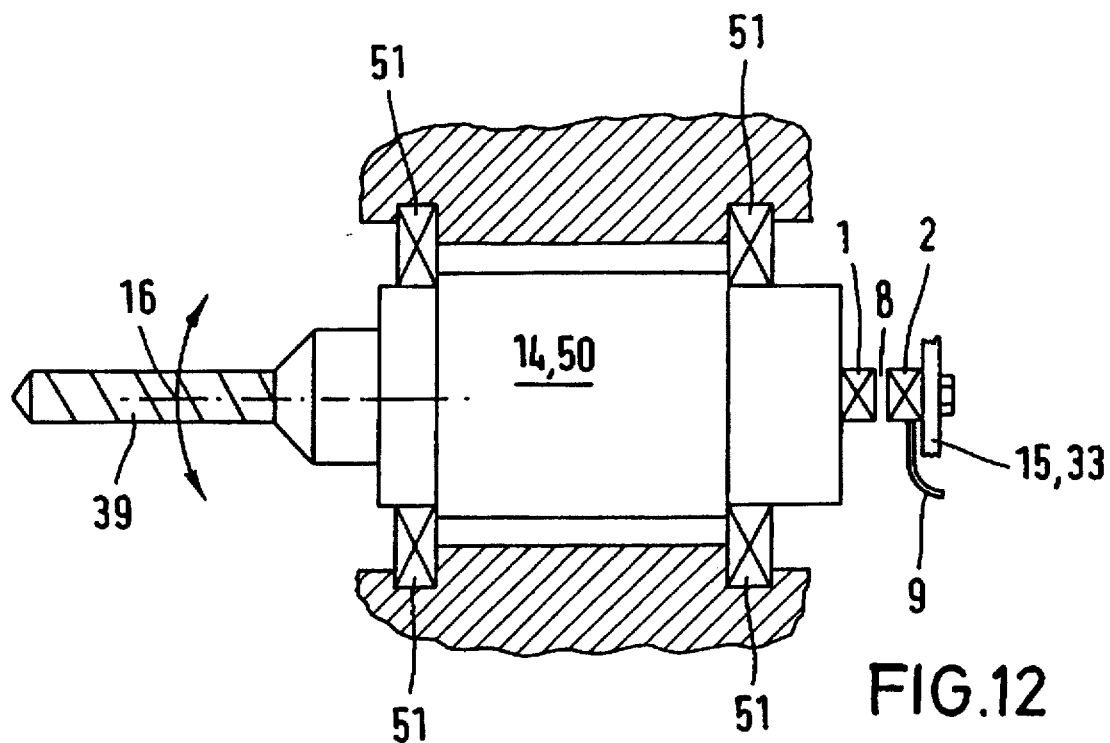
Figure 13:
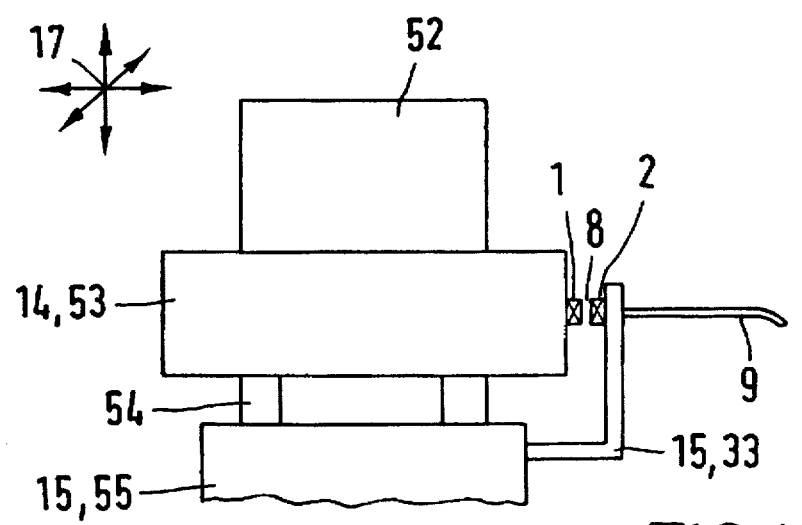
Figure 14:
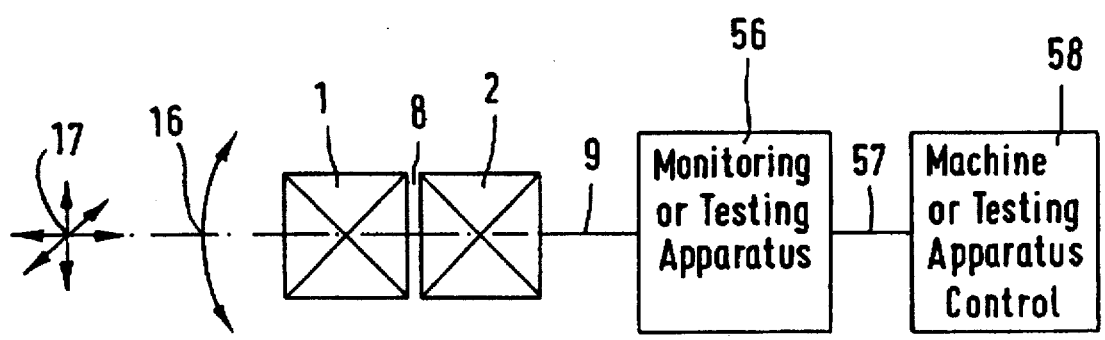

FIG. 4 is an embodiment of the invention, wherein the sensor elements are sunk in, FIG. 5 is a receiver device with integrated amplifier, FIG. 5A is a left end view of the receiver device shown in FIG. 5, FIG. 6 is a receiver or sensor housing with a fastening groove, FIG. 6A is a left end view of the receiver or sensor housing shown in FIG. 6, FIG. 7 is a receiver or sensor housing with a fastening collar, FIG. 8 shows a sensor system with a single receiver device and a plurality of sensor devices, FIG. 9 shows an arrangement of the sensor system with tool revolvers in lathes, FIG. 10 shows a second embodiment of a sensor system for tool revolvers, FIG. 11a shows an embodiment of the sensor system in a machining center with pallet stations, FIG. 11b is a plan view of FIG. 11a, FIG. 12 shows an embodiment of the sensor system at the open shaft end of a drilling or milling spindle, FIG. 13 shows an embodiment of the sensor system in a noise testing stand, and FIG. 14 shows a circuit structure of a monitoring or testing system including the sensor system of the invention.

In detail, the sensor system is comprised of a sensor device 1 contactlessly cooperating with a receiver device 2. In the manner of a transformer, the vibration energy of an electrodynamic or piezoelectric measuring element 5 is contactlessly transmitted to a secondary coil 7 of the receiver device 2 by means of a primary coil 6 electrically connected with the measuring element 5 without using additional components. Between the oppositely arranged transformer-like pair of coils 6, 7 an air gap 8 is left with a width between about 0.2 mm and 2 mm. The measuring element 5 is connected with the primary coil 6 via connecting lines 10, whereas the secondary coil 7 is connected to a monitoring or testing device 56 via electric connecting lines 10 and a cable 9.

Figure 1:
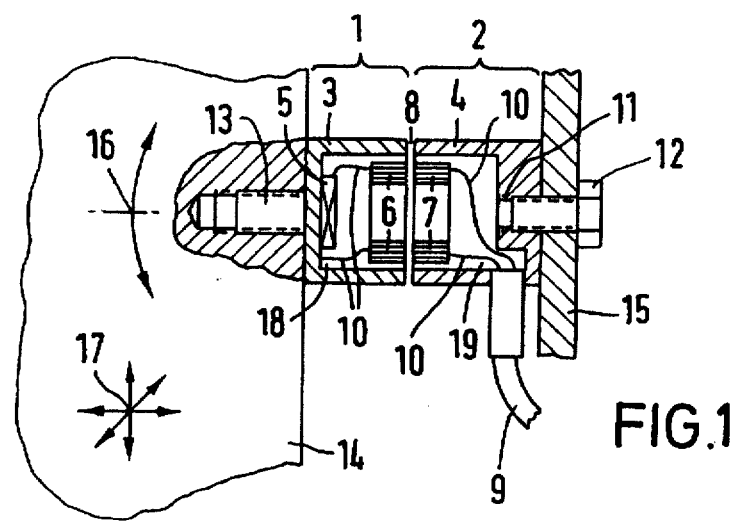
FIG. 1 is a first embodiment of the invention.

In the embodiment of FIG. 1, the sensor device 1 and the receiver device 2 are located in a sensor housing 3 of metal or in a receiver housing 4 of metal, respectively. The sensor housing 3 is fastened in a traversing and/or rotating machine element 14 by means of a threaded pin. The axis of rotational movement of the machine element 14 is represented by an arrow 16, whereas the axes of translational motion are indicated by an arrow 17.

The metal receiver housing 4 is fastened to a stationary machine element 15 by means of a screw 12.

Preferably, the sensor housing 3 and the receiver housing 4 are of the same diameter, they are cylindric in shape and arranged coaxially with a mutual distance in form of the air gap 8.

In the sensor device 1, the sensor housing 3 consists of a hollow cylindrical metal sleeve, the measuring element 5 being fastened in a suitable manner in the cavity 18 on the bottom element. Preferably, the cavity 18 is filled with a suitable casting compound that simultaneously keeps the primary coil 6 in its position.

The receiver housing 4 also consists of a hollow cylindrical metal sleeve with a cavity 19 in which the secondary coil 7 is embedded in a casting compound. A cable 9 extends out from the housing 4. The bottom of the receiver housing 4 has a thread 11 for fastening the receiver housing 4 to the stationary machine element 15 by means of the screw 12.

The electrical mass (ground) of the measuring element 5 is directly connected to the electrical mass (ground) of the machine element 14 via the metal housing 3.

Figure 2:
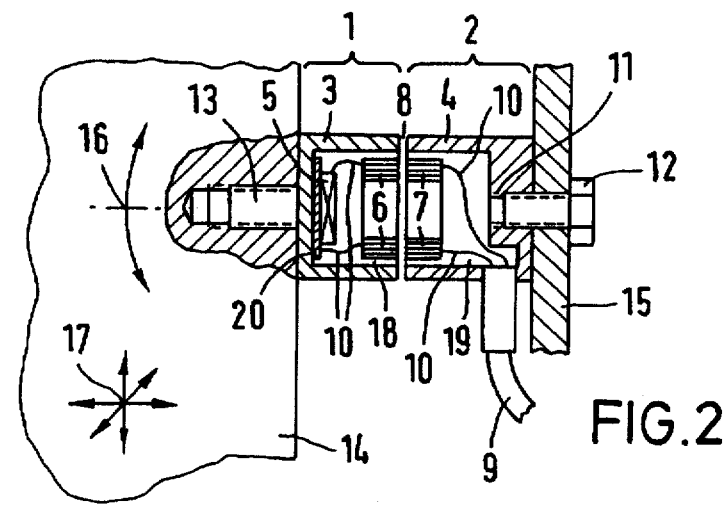
FIG. 2 is an embodiment with an electric insulator.

FIG. 2 shows another embodiment of the sensor system with an insulator 20 being arranged between the measuring element 5 and the bottom of the metal housing 3.

Figure 3:
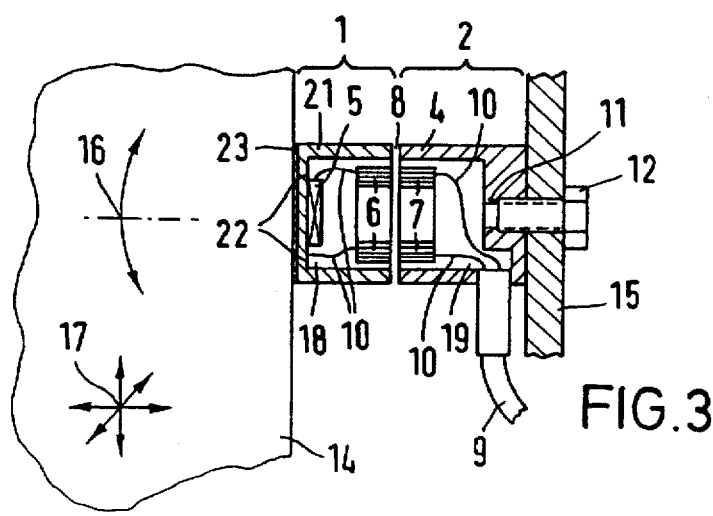
FIG. 3 shows an embodiment with a sensor housing of insulating material.

In the embodiment of FIG. 3 it is provided that the housing 21 of the sensor device 1 is made of electrically insulating material to electrically insulate the mass of the measuring element 5 from the electrical mass of the machine element 14, the material, such as insulating ceramics, still having good vibration or structure-borne noise conducting properties. In order to shield the sensor means 1 from electromagnetic noises, a shielding is provided consisting in that the interior of the housing 21 is clad with metal and that this lining 22 is electrically connected with the electrical mass of the measuring element 5.

FIG. 4 shows an alternative to the embodiment of FIG. 3. Again, the housing 21 is made of an electrically insulating material with good vibration or structure-borne noise conducting properties, the sensor device being shielded from electromagnetic noises by sinking the sensor device 1 into the machine element 14. The sensor housing 21 is sunk in a recess 26 of the machine element 14 using a glue 23.

The receiver device 2 is correspondingly sunk in a recess 27 of the machine element 15 using glue 24. In this embodiment, the machine element 15 has a bore 25 serving as a cable outlet for the cable 9.

The embodiment of FIG. 5 shows a receiver device 2 with an integrated impedance converter or amplifier device 29 which is connected to the secondary coil 7 through electric connecting wires 10 and to which the cable 9 is connected through connecting wires 28.

FIG. 6 shows a sensor or receiver housing with a fastening means 32 in the form of a groove, whereas FIG. 7 shows a sensor or receiver housing with a fastening means 32 in the form of a collar.

FIG. 8 shows the implementation of the sensor system in tool revolvers of lathes having a plurality of tool holders 36. One sensor device 1 is provided for each tools holder 36, whereas only one receiver device 2 is provided opposite the sensor device 1 the tool of which is in the operating position. Through a holder that at the same time forms the stationary machine element 15, the revolver housing 34 of the lathe is mounted with a receiver device 2 that is adapted to contactlessly receive measurement signals from an oppositely arranged sensor device 1. The sensor device 1 is arranged on a tool holder 36 on a revolver disc 35 with one or a plurality of tools, the sensor device being located on the side facing away from the tool, and it may be sunk in the tool holder 36, as shown in the partial illustration A, or set on the same, as shown in the partial illustration B. In this embodiment, only one receiver device 2 is required that corresponds to the sensor device 1 of the tool in the operating position. The tool 39 mounted on the tool holder 36 operates on a workpiece 38.

FIG. 9 shows an embodiment wherein the sensor system is implemented in a tool revolver of a lathe. The revolver disc 35 may have any number of tool holders 36. In this embodiment, only one sensor device 1 and one receiver device 2 are arranged in the revolver center in the rotational axis. At 34, a revolver housing of a lathe is represented, whereas 40 designates the hollow shaft of a tool revolver. Arranged in the tool revolver and concentrically with the hollow shaft 40 is a stationary holding device 47, a recess 27 of the end face thereof facing towards the revolver disc 35 receives the receiver device 2 flush with the end face, while observing the air gap 8. A recess 26 in the revolver disc 35 receives the sensor device 1 coaxially with the receiver device 2, the sensor device 1 also being flush with the end face of the revolver disc 35 facing towards the holding device 47.

This sensor system allows to pick off the vibration or structure-borne noise signals directly from the revolver disc 35.

The arrow 37 indicates the cycle of rotation of the revolver disc 35 and the arrow 42 represents the machining movement of the revolver disc corresponding to the cycle of rotation.

FIG. 10 shows an embodiment similar to FIG. 9, wherein, however, the sensor system is arranged at the rear end-face end of the hollow shaft 40. The hollow shaft 40 rotates with the revolver disc 35, the sensor device 1 and the receiver device 2 being arranged coaxially with the rotational axis 16 of the revolver disc. Here, the receiver device 2 is fastened on a stationary machine element 15, as described before, which may consist of a holder 33.

FIGS. 11a, b show a milling or drilling machine or a machining center with pallet stations. A pallet 44 is located in the machining station, the pallet being positionable in offsets of 90° and being, e.g., square in shape. Each of the four lateral end faces has a sensor device 1 sunk therein coaxially with the respective center axis through the pallet 44. At least one receiver device 2 is mounted on a stationary machine element 15 and enclosed by a protective sheathing 45. It is likewise possible to dispose a plurality of receiver devices 2 opposite the respective positions of the sensor device 1. The pallet 44 is located on a positioning table, a cycle table or a turntable 46 connected to the machine bed or a guiding support 49 through guidings 48. On the pallet 44 that forms the traversing or rotating machine element 14, a workpiece 38 is mounted using a workpiece chucking device 43. The workpiece 38 is acted upon, e.g., by a milling tool 39, the structure-borne noise signals and vibration signals induced thereby being picked up by the sensor system.

FIG. 12 illustrates an example for the implementation of the sensor system in a drilling or milling spindle 50 that is rotatably supported at its front and rear ends by means of bearings 51. The tool 39 employed is a drill bit. At the free end of the shaft of the spindle 50, a sensor device 1 is arranged coaxially with the rotational axis of the spindle 50. Opposite this sensor device 1 rotating with the spindle 50, a receiver device 2 is arranged fixedly on a holder 33 and coaxially with the spindle axis, while observing the air gap 8.

The embodiment of FIG. 13 shows the application of the sensor system to a noise testing stand. A transport device 53, on which an structural unit 52 is arranged, is placed for testing onto a noise testing machine 55 with interposed noise or vibration dampers 54. The sensor device 1 is fastened to one end face of the transport device, whereas the receiver device 2 is disposed, via a holder 33 connected as a stationary machine element 15 to the noise testing machine 55, such that the receiver device 2 is spaced from and positioned coaxially with the sensor device 1, while observing the air gap 8.

In noise testing of noise-generating structural units, such as motors, gears and the like, the sensor system is employed for detecting the noise quality of the structural unit. Using testing or monitoring apparatus in connection with the sensor system allows to perform noise quality testing.

FIG. 14 is a schematic illustration of a monitoring or testing system using the sensor system 1, 2. This sensor system generates vibration and/or structure-borne noise signals fed to a monitoring or testing apparatus 56 via a cable 9, and after evaluation they are supplied to a machine or testing apparatus control 58 via an interface 57, whereby the sensor system may be employed in process monitoring.

Monitoring of tools refers to the detection of monitoring criteria, such as tool contact, tool rupture, tool cracking, tool wear or tool vibrations.

I claim:

1. A sensor system consisting of at least two vibration or structure-borne noise sensor devices (1), a plurality of movable machine elements (14, 36), one of said noise sensor devices (1) mounted on one of said movable machine elements (14, 36) and another of said noise sensor devices (1) mounted on another of said movable machine elements (14, 36), a receiver device (2) with a pair of transformer coils (6, 7), the system contactlessly transmitting the vibration energy of an electrodynamic or piezoelectric measuring element (5) via a primary coil (6) arranged in said sensor device (1) to a secondary coil (7) of said pair of transformer coils (6, 7), said secondary coil (7) being arranged in said receiver device (2) spaced from said sensor device (1) by an air gap (8), said receiver device further transmitting the measured and transformed vibration or structure-borne noise measuring signal, such that said measuring element (5) is connected directly with said primary coil (6) without any other components and said measuring element (5) is mounted on the movable machine element (14, 36), said receiver device (2) is disposed on a stationary machine element (15), and one of said sensor devices transforming a measured signal to said receiver device (2) every time the movable machine element (14) is positioned with its sensor device (1) such that said primary (6) and said secondary coil (7) are opposite each other at least during the monitoring process, while maintaining said air gap (8).

2. A sensor system consisting of at least two vibration or structure-borne noise sensor devices (1) at least one movable machine element (14), at least two of said noise sensor devices (1) mounted on said movable machine element (14), a receiver device (2) with a pair of transformer coils (6, 7), the system contactlessly transmitting the vibration energy of an electrodynamic or piezoelectric measuring element (5) via a primary coil (6) arranged in said sensor device (1) to a secondary coil (7) of said pair of transformer coils (6, 7), said secondary coil (7) being arranged in said receiver device (2) spaced from said sensor device (1) by an air gap (8), said receiver device further transmitting the measured and transformed vibration or structure-borne noise measuring signal, such that said measuring element (5) is connected with said primary coil (6) without any other components and said measuring element (5) is mounted on the movable machine element (14), said receiver device (2) is disposed on a stationary machine element (15), and one of said sensor devices transforming a measured signal to said receiver device (2) every time the movable machine element (14) is positioned with its sensor device (1) such that said primary (6) and said secondary coil (7) are opposite each other at least during the monitoring process, while maintaining said air gap (8).

3. The sensor system of claim 1 or 2 and further comprising a plurality of receiver devices (2) arranged on stationary or movable machine elements (14, 15), measuring signals being transformed to any of said receiver devices (2) by any of said sensor devices (1) when a sensor device (1) is positioned opposite a receiver device (2) such that said primary (6) and said secondary coil (7) are facing each other while maintaining said air gap (8).

4. The sensor system of claim 1 or 2 wherein said primary and said secondary coils (6, 7) of said sensor and receiver devices (1, 2) are substantially coaxial with respect to each other and that said air gap (8) or the distance between them is not less than about 0.2 mm, but not more than about 2 mm, however, the air gap distance is always the same if the sensor and receiver devices (1, 2) are interchangeable.

5. The sensor system of claim 1 or 2 wherein said sensor device (1) or said receiver device (2) are disposed in a recess (18, 19) of the respective machine element (14, 36, 15).

6. The sensor system of claim 1 or 2 and further comprising a sensor or receiver housing (3, 4) in which the sensor or receiver (1, 2) are mounted.

7. The sensor system of claim 6 wherein said sensor or said receiver device (1, 2) have an offset collar (12) that at least partly surrounds said housing (3, 4) and serves to mount said housing (3, 4) in said machine elements (14, 15) using suitable chucking means.

8. The sensor system of claim 7, wherein said measuring element (5) is directly electrically connected with the movable machine element (14) via said metal housing (3).

9. The sensor system of claim 7 wherein for electrically insulating the measuring element (5) from the machine element (14), a housing (21) of said sensor device (1) is made of an electrically insulating material with vibration or structure-borne noise conducting properties, on which said measuring element (5) is fastened, and said sensor device (1) is embedded in said machine element (14, 15).

10. The sensor system of one of claims 1 or 2, characterized in that said receiver device (2) has an impedance converter or amplifier assembly (29) besides said secondary coil (7).

11. The system of claim 7 wherein for electrically insulating the measuring element (5) from the machine element (14), a housing (21) of said sensor device (1) is made of an electrically insulated material with vibration or structure-borne noise conducting properties, on which said measuring element (5) is fastened and shields said sensor device (1) from electromagnetic noises, said sensor device (1) is embedded in said machine element (14, 15) and in which the shielding is realized by a metal lining (22) on the inside of said housing (21), the lining (22) electrically connected with the measuring element (5).

12. The sensor system of claim 6 wherein said housing (3, 4) has a groove that at least partly surrounds said housing (3, 4) and serves to mount said housing (3, 4) in said machine elements (14, 15) using suitable chucking means.

* * * * *